(12) United States Patent
Harbers et al.

(10) Patent No.: US 9,927,111 B2
(45) Date of Patent: Mar. 27, 2018

(54) LED BASED ILLUMINATION DEVICE WITH INTEGRATED OUTPUT WINDOW

(71) Applicant: Xicato, Inc., San Jose, CA (US)

(72) Inventors: Gerard Harbers, Sunnyvale, CA (US); Gregory W. Eng, Fremont, CA (US); Jim W. Li, Fremont, CA (US)

(73) Assignee: Xicato, Inc., San Jose, CA (US)

( * ) Notice: Subject to any disclaimer, the term of this patent is extended or adjusted under 35 U.S.C. 154(b) by 245 days.

(21) Appl. No.: 14/489,350

(22) Filed: Sep. 17, 2014

(65) Prior Publication Data

US 2015/0078004 A1    Mar. 19, 2015

Related U.S. Application Data

(60) Provisional application No. 61/879,005, filed on Sep. 17, 2013.

(51) Int. Cl.
*F21V 29/00*    (2015.01)
*F21V 99/00*    (2006.01)
(Continued)

(52) U.S. Cl.
CPC .......... *F21V 29/004* (2013.01); *B23K 1/0016* (2013.01); *F21K 9/64* (2016.08);
(Continued)

(58) Field of Classification Search
CPC combination set(s) only.
See application file for complete search history.

(56) References Cited

U.S. PATENT DOCUMENTS

| 5,379,155 A | 1/1995 | Goetschmann et al. |
| 5,959,316 A | 9/1999 | Lowery |
| (Continued) | | |

FOREIGN PATENT DOCUMENTS

WO    WO 2012/169407 A1    12/2012

OTHER PUBLICATIONS

Invitation to Pay Additional Fees mailed on Jan. 5, 2015 for International Application No. PCT/US2014/056166 filed on Sep. 17, 2014 by Xicato, Inc., 4 pages.
(Continued)

*Primary Examiner* — Nimeshkumar Patel
*Assistant Examiner* — Jacob R Stern
(74) *Attorney, Agent, or Firm* — Silicon Valley Patent Group LLP

(57) ABSTRACT

An LED based illumination device includes LEDs mounted to an LED mounting board, an integrated output window sub-assembly, and a thermal frame coupled between the integrated output window sub-assembly and the LED mounting board. The integrated output window sub-assembly may include an output window and a thermally conductive ring coupled to the perimeter surface of the output window. The thermally conductive ring may have a radial width equal to or greater than the thickness of the output window. Additionally, the output window and the thermally conductive ring may have coplanar top and bottom surfaces. The thermally conductive ring surrounding the perimeter of the output window may include one or more pockets into which a curable, thermally conductive bonding material is disposed in an uncured state and flows into a gap between the perimeter of the output window and the thermally conductive ring.

14 Claims, 9 Drawing Sheets

(51) Int. Cl.
  *B23K 1/00* (2006.01)
  *F21V 7/22* (2006.01)
  *F21V 3/04* (2018.01)
  *F21V 17/10* (2006.01)
  *F21V 29/506* (2015.01)
  *F21K 9/64* (2016.01)
  *F21Y 115/10* (2016.01)

(52) U.S. Cl.
  CPC .............. *F21V 3/0409* (2013.01); *F21V 7/22* (2013.01); *F21V 17/101* (2013.01); *F21V 29/506* (2015.01); *F21Y 2115/10* (2016.08); *Y10T 29/49885* (2015.01); *Y10T 29/49888* (2015.01); *Y10T 29/49966* (2015.01)

(56) References Cited

U.S. PATENT DOCUMENTS

| | | | |
|---|---|---|---|
| 6,351,069 B1 | 2/2002 | Lowery et al. | |
| 6,381,081 B1 | 4/2002 | Ford | |
| 6,504,301 B1 | 1/2003 | Lowery | |
| 6,586,882 B1 | 7/2003 | Harbers | |
| 6,600,175 B1 | 7/2003 | Baretz et al. | |
| 6,680,569 B2 | 1/2004 | Mueller-Mach et al. | |
| 6,812,500 B2 | 11/2004 | Reeh et al. | |
| 7,126,162 B2 | 10/2006 | Reeh et al. | |
| 7,250,715 B2 | 7/2007 | Mueller et al. | |
| 7,479,662 B2 | 1/2009 | Soules et al. | |
| 7,564,180 B2 | 7/2009 | Brandes | |
| 7,614,759 B2 | 11/2009 | Negley | |
| 7,629,621 B2 | 12/2009 | Reeh et al. | |
| 8,104,908 B2 | 1/2012 | Harbers et al. | |
| 8,172,434 B1* | 5/2012 | Olsson | B63B 45/00 362/241 |
| 8,227,962 B1* | 7/2012 | Su | F21K 9/135 313/46 |
| 2005/0116644 A1* | 6/2005 | Kim | H05K 7/20963 313/582 |
| 2005/0185406 A1* | 8/2005 | Koelger | G03B 21/16 362/267 |
| 2007/0081336 A1 | 4/2007 | Bierhuizen et al. | |
| 2011/0073878 A1* | 3/2011 | Li | F21K 9/00 257/88 |
| 2012/0049026 A1 | 3/2012 | Rangaswamy et al. | |
| 2012/0248977 A1* | 10/2012 | Ootorii | H01L 25/167 313/524 |

OTHER PUBLICATIONS

Abstract of WO 2012/169407 in English visited at www.espacenet.com on Mar. 10, 2015, 2 pages.

International Search Report and Written Opinion dated Jul. 29, 2015 for International Application No. PCT/US2014/056166 filed on Sep. 17, 2014 by Xicato, Inc., 14 pages.

* cited by examiner

LED BASED ILLUMINATION DEVICE WITH INTEGRATED OUTPUT WINDOW

CROSS REFERENCE TO RELATED APPLICATIONS

This application claims priority under 35 USC 119 to U.S. Provisional Application No. 61/879,005, filed Sep. 17, 2013, which is incorporated by reference herein in its entirety.

TECHNICAL FIELD

The described embodiments relate to illumination devices that include Light Emitting Diodes (LEDs), and more particularly an illumination device that uses LEDs and includes integrated output window.

BACKGROUND

The use of LEDs in general lighting is becoming more desirable. LED illumination devices sometimes use wavelength converting materials to generate a desired color point. The color conversion of light by wavelength converting materials, however, generates a significant amount of heat that will adversely affect the wavelength converting materials over time, e.g., degrading the color conversion performance and altering the color point of the light produced by the illumination device over time. Consequently, improvements to illumination device that uses light emitting diodes as the light source are desired.

SUMMARY

An LED based illumination device includes LEDs mounted to an LED mounting board, an integrated output window sub-assembly, and a thermal frame coupled between the integrated output window sub-assembly and the LED mounting board. The integrated output window sub-assembly may include an output window and a thermally conductive ring coupled to the perimeter surface of the output window. The thermally conductive ring may have a radial width equal to or greater than the thickness of the output window. Additionally, the output window and the thermally conductive ring may have coplanar top and bottom surfaces. The thermally conductive ring surrounding the perimeter of the output window may include one or more pockets into which a curable, thermally conductive bonding material is disposed in an uncured state and flows into a gap between the perimeter of the output window and the thermally conductive ring.

In one implementation, an LED based illumination device includes a plurality of LEDs mounted to an LED mounting board; an integrated output window sub-assembly comprising: an output window having a top surface, a bottom surface, and a perimeter surface, wherein the output window has a thickness between the top surface and the bottom surface, a thermally conductive ring coupled to the perimeter surface of the output window, the thermally conductive ring has a radial width that is equal to or greater than the thickness of the output window, the thermally conductive ring having a top surface and a bottom surface that are coplanar with the top surface and the bottom surface of the output window, respectively; and a thermal frame coupled between the integrated output window sub-assembly and the LED mounting board.

In one implementation, a method includes coating a highly reflective material on an external cylindrical surface of a solid cylinder of transmissive material; locating a cylindrically shaped sleeve of thermally conductive material over the coated, solid cylinder of transmissive material; dispensing a thermally conductive material between the solid cylinder of transmissive material and the sleeve to form an integrated cylindrically shaped assembly; cutting the integrated assembly along a plane perpendicular to a central axis of the cylindrical assembly to form a thin slice of the integrated cylindrical assembly; and polishing a top surface and a bottom surface of the slice of the integrated cylindrical assembly.

In one implementation, a method includes disposing a highly reflective cylindrically shaped sleeve of thermally conductive ceramic material over an cylindrically shaped, external surface of a solid cylinder of transmissive material; bonding the thermally conductive ceramic material and the transmissive material at the external surface of the solid cylinder of transmissive material to form an integrated cylindrical assembly; cutting the integrated assembly along a plane perpendicular to a central axis of the integrated cylindrical assembly to form a thin slice of the integrated cylindrical assembly; and polishing a top surface and a bottom surface of the slice of the integrated cylindrical assembly.

In one implementation, an LED based illumination device includes an output window comprising a wavelength converting material; a thermally conductive ring surrounding the perimeter of the output window; and a curable, thermally conductive bonding material disposed between the output window and the thermally conductive ring, wherein the thermally conductive ring includes one or more pockets, wherein the curable, thermally conductive bonding material is disposed into the one or more pockets in an uncured state and flows into a gap between the perimeter of the output window and the thermally conductive ring.

DETAILED DESCRIPTION

Reference will now be made in detail to background examples and some embodiments of the invention, examples of which are illustrated in the accompanying drawings.

Figure 1:
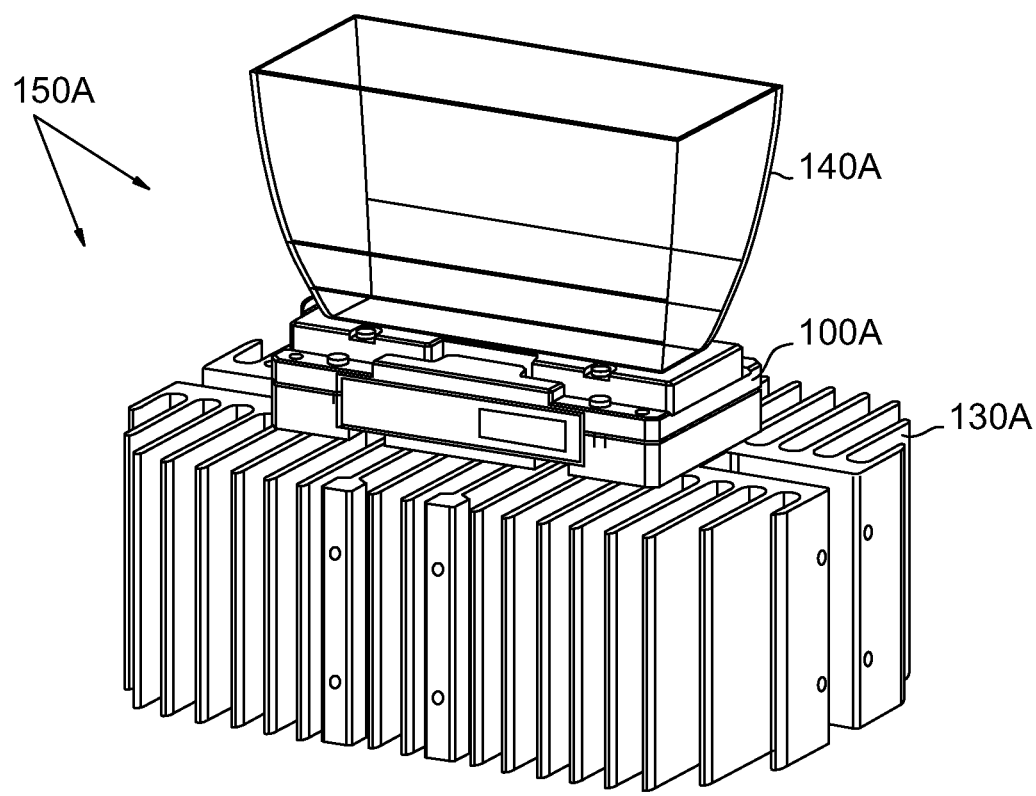
FIGS. 1 and 2 illustrate exemplary luminaires, including an illumination device, reflector, and light fixture.
Figure 2:
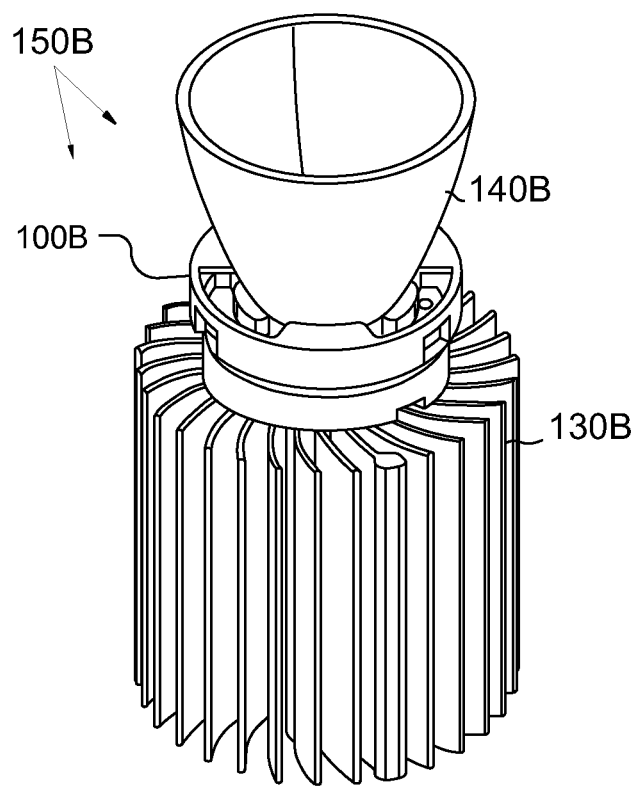

FIGS. 1-2 illustrate two exemplary luminaires, respectively labeled 150A and 150B (sometimes collectively or generally referred to as luminaire 150). The luminaire 150A illustrated in FIG. 1 includes an LED based illumination device 100A with a rectangular form factor. The luminaire 150B illustrated in FIG. 2 includes an LED based illumination device 100B with a circular form factor. These examples are for illustrative purposes. Examples of LED based illumination devices of general polygonal and elliptical shapes may also be contemplated. FIG. 1 illustrates luminaire 150A with an LED based illumination device 100A, reflector 140A, and light fixture 130A. FIG. 2 illustrates luminaire 150B with an LED based illumination module 100B, reflector 140B, and light fixture 130B. For the sake of simplicity, LED based illumination module 100A and 100B may be collectively referred to as illumination module 100, reflector 140A and 140B may be collectively referred to as reflector 140, and light fixture 130A and 130B may be collectively referred to as light fixture 130. As depicted, light fixture 130 is a heat sink, and thus, may sometimes be referred as heat sink 130. However, light fixture 130 may include other structural and decorative elements (not shown). Reflector 140 is mounted to illumination device 100 to collimate or deflect light emitted from LED based illumination device 100. The reflector 140 may be made from a thermally conductive material, such as a material that includes aluminum or copper and may be thermally coupled to illumination device 100. Heat flows by conduction through illumination device 100 and the thermally conductive reflector 140. Heat also flows via thermal convection over the reflector 140. Reflector 140 may be a compound parabolic concentrator, where the concentrator is constructed of or coated with a highly reflecting material. Compound parabolic concentrators tend to be tall, but they often are used in a reduced length form, which increases the beam angle. An advantage of this configuration is that no additional diffusers are required to homogenize the light, which increases the throughput efficiency. Optical elements, such as a diffuser or reflector 140 may be removably coupled to illumination device 100, e.g., by means of threads, a clamp, a twist-lock mechanism, or other appropriate arrangement.

As depicted in FIGS. 1 and 2, LED based illumination device 100 is mounted to heat sink 130. Heat sink 130 may be made from a thermally conductive material, such as a material that includes aluminum or copper and may be thermally coupled to LED based illumination device 100. Heat flows by conduction through LED based illumination device 100 and the thermally conductive heat sink 130. Heat also flows via thermal convection over heat sink 130. LED based illumination device 100 may be attached to heat sink 130 by way of screw threads to clamp the LED based illumination device 100 to the heat sink 130. To facilitate easy removal and replacement of LED based illumination device 100, LED based illumination device 100 may be removably coupled to heat sink 130, e.g., by means of a clamp mechanism, a twist-lock mechanism, or other appropriate arrangement. LED based illumination device 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the LED based illumination device 100.

Figure 3:
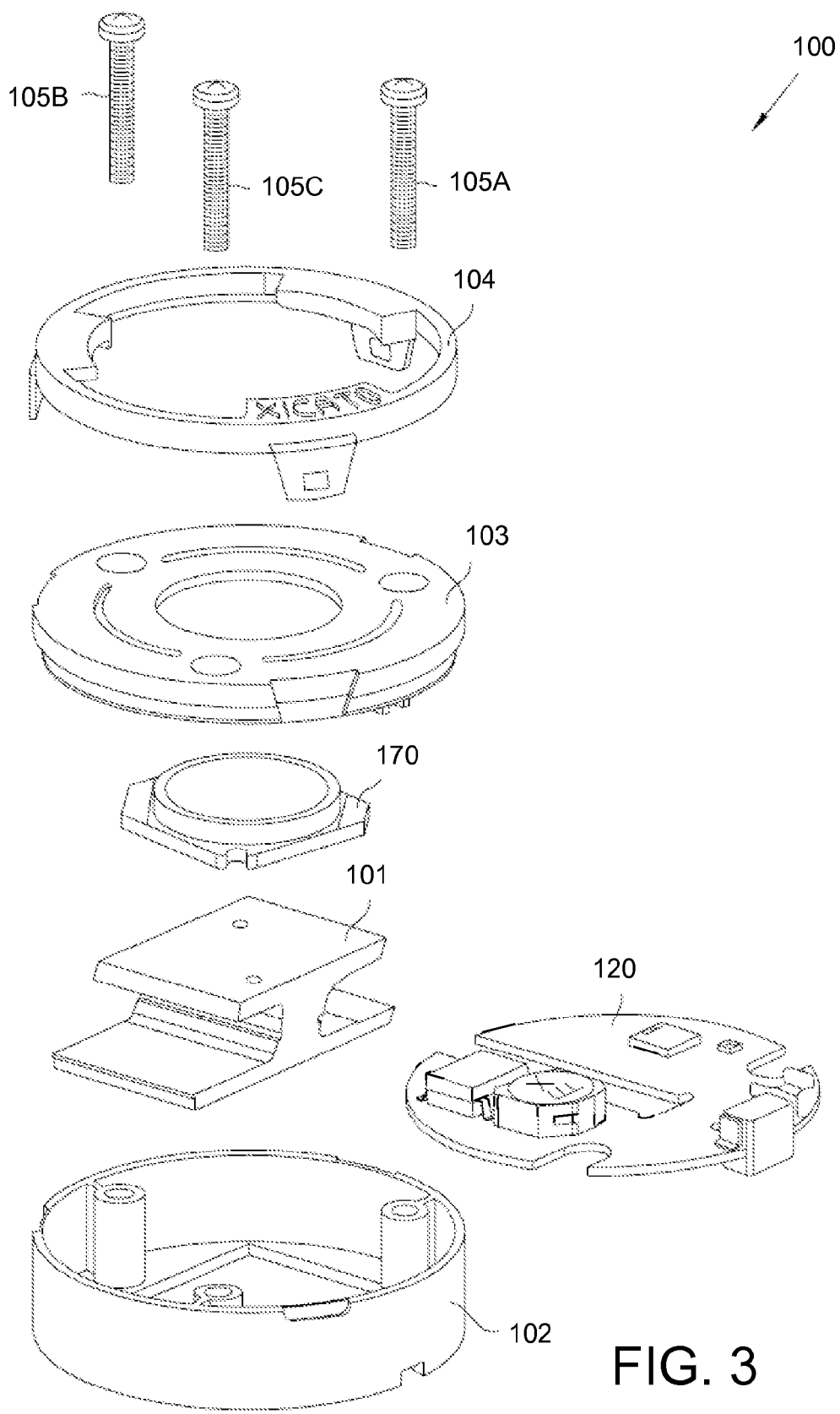
FIG. 3 shows an exploded view illustrating components of the LED based illumination device shown in FIG. 2.

FIG. 3 shows an exploded view illustrating components of LED based illumination device 100 as depicted in FIG. 2. It should be understood that as defined herein an LED based illumination device is not an LED, but is an LED light source or fixture or component part of an LED light source or fixture. LED based illumination device 100 includes an LED based light LED based light emitting engine 160 configured to generate an amount of light. The LED based light emitting engine used in LED based illumination device may be any of the LED based light emitting engine discussed herein. LED based light LED based light emitting engine 160 is coupled to I-beam shaped mounting base 101 to promote heat extraction from LED based light LED based light emitting engine 160. Optionally, an electronic interface module (EIM) 120 is located between the flanges of I-beam shaped mounting base 101. LED based light LED based light emitting engine 160 and I-beam shaped mounting base 101 are enclosed between a lower housing 102 and an upper housing 103. An optional reflector retainer 104 is coupled to upper housing 103. Reflector retainer 104 is configured to facilitate attachment of different reflectors to the LED based illumination device 100. Fasteners 105A-C are employed to affix LED based illumination device 100 to a heat sink.

Figure 4:
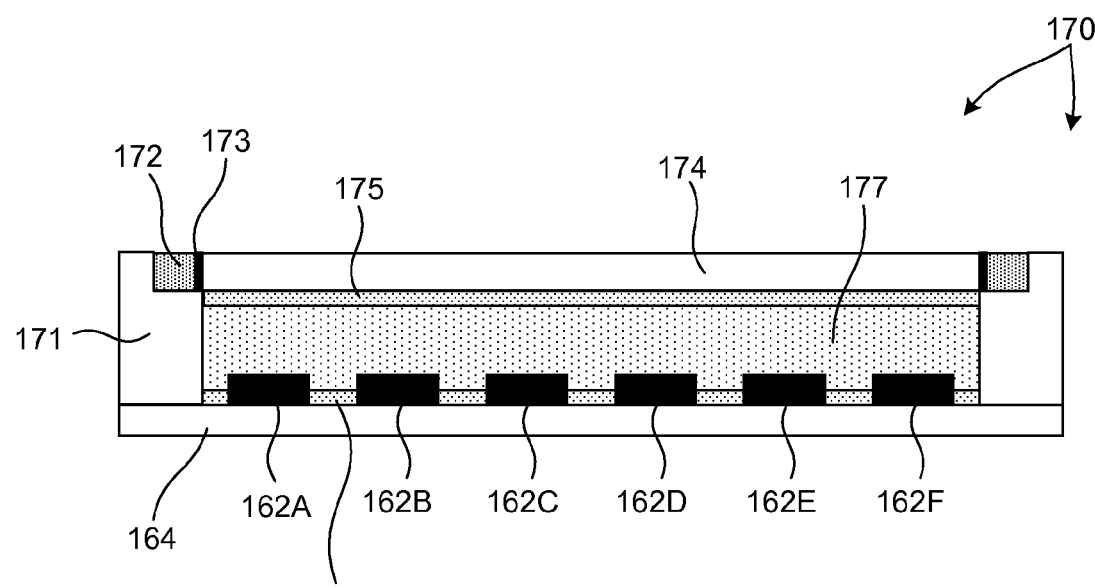
FIG. 4 is a diagram illustrating a cutaway view illustrating an LED based light emitting engine that includes an LED mounting board, an integrated output window sub-assembly, and a thermal frame coupled between the integrated output window sub-assembly and the LED mounting board.

FIG. 4 is illustrative of a LED based light emitting engine 170 in one embodiment. LED based light emitting engine 170 includes one or more LED die or packaged LEDs and a mounting board to which LED die or packaged LEDs are attached. In addition, LED based light emitting engine 170 includes one or more transmissive elements (e.g., windows or sidewalls) coated or impregnated with one or more wavelength converting materials to achieve light emission at a desired color point.

As illustrated in FIG. 4, LED based light emitting engine 170 includes a number of LEDs 162A-F (collectively referred to as LEDs 162) mounted to mounting board 164 in a chip on board (COB) configuration. The spaces between each LED are filled with a reflective material 176 (e.g., a white silicone material). In addition, a thermal frame 171 surrounds the LEDs 162 and supports output window 174. In the embodiment depicted in FIG. 4, the space between LEDs 162 and output window 174 is filled with an encapsulating material 177 (e.g., silicone) to promote light extraction from LEDs 162 and to separate LEDs 162 from the environment. In other embodiments, encapsulating material 177 is disposed over the LEDs 162 in a thin layer to separate LEDs 162 from the environment and protect sensitive wire bonds. A typical layer thickness is between one hundred and five hundred micrometers. In some other embodiments, encapsulating material 177 is not employed. In the depicted embodiment, the thermal frame 171 is both a thermally conductive structure that conducts heat from output window 174 to LED mounting board 164 and an optically reflective structure that reflects incident light from LEDs 162 toward output window 174. As such, thermal frame 171 may be constructed from any suitable thermally conductive material (e.g., aluminum, copper, thermally conductive ceramic material, etc.). In addition, thermal frame 171 may be constructed from a highly reflective material or a highly reflective material may be deposited on surfaces of thermal frame 171 exposed to light emitted from LEDs 162.

LEDs 162 can emit different or the same color light, either by direct emission or by phosphor conversion, e.g., where phosphor layers are applied to the LEDs as part of the LED package. The illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the illumination device 100 has a desired color when LEDs 162 are used in combination with wavelength converting materials on output window 174, for example. By tuning the chemical and/or physical (such as thickness and concentration) properties of the wavelength converting materials and the geometric properties of the coatings on the surface of output window 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y3Al5O12$:Ce, (also known as YAG:Ce, or simply YAG) $(Y,Gd)3Al5O12$:Ce, CaS:Eu, SrS:Eu, $SrGa2S4$:Eu, $Ca3(Sc,Mg)2Si3O12$:Ce, $Ca3Sc2Si3O12$:Ce, $Ca3Sc2O4$:Ce, $Ba3Si6O12N2$:Eu, $(Sr,Ca)AlSiN3$:Eu, $CaAlSiN3$:Eu, $CaAlSi(ON)3$:Eu, $Ba2SiO4$:Eu, $Sr2SiO4$:Eu, $Ca2SiO4$:Eu, $CaSc2O4$:Ce, $CaSi2O2N2$:Eu, $SrSi2O2N2$:Eu, $BaSi2O2N2$:Eu, $Ca5(PO4)3Cl$:Eu, $Ba5(PO4)3Cl$:Eu, $Cs2CaP2O7$, $Cs2SrP2O7$, $Lu3Al5O12$:Ce, $Ca8Mg(SiO4)4Cl2$:Eu, $Sr8Mg(SiO4)4Cl2$:Eu, $La3Si6N11$:Ce, $Y3Ga5O12$:Ce, $Gd3Ga5O12$:Ce, $Tb3Al5O12$:Ce, $Tb3Ga5O12$:Ce, and $Lu3Ga5O12$:Ce.

In one example, the adjustment of color point of the illumination device may be accomplished by adding or removing wavelength converting material from output window 174. In one embodiment, a mixture 175 of a red emitting phosphor such as an alkaline earth oxy silicon nitride and a yellow emitting phosphor such as a YAG phosphor covers a portion of output window 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the output window 174, and selecting which portions of output window 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of output window 174. By way of example, a red emitting phosphor may be patterned on different areas of the output window 174 and a yellow emitting phosphor may be patterned on other areas of output window 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Output window 174 may be constructed from a suitable optically transmissive material (e.g., sapphire, quartz, alumina, crown glass, polycarbonate, and other plastics). Output window 174 is spaced above the light emitting surface of LEDs 162 by a clearance distance. In some embodiments, this is desirable to allow clearance for wire bond connections from the LED package submount to the active area of the LED. In some embodiments, a clearance of two millimeters or less is desirable to allow sufficient light mixing and clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach output window 174 directly to the surface of the LED 162. In this manner, the direct thermal contact between output window 174 and LEDs 162 promotes heat dissipation from LEDs 162. In some other embodiments, the space between mounting board 164 and output window 174 may be filled with a solid encapsulate material. By way of example, silicone may be used to fill the space. In some other embodiments, the space may be filled with a fluid to promote heat extraction from LEDs 162.

In the embodiment illustrated in FIG. 4, the surface of output window 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple output window 174 to LEDs 162 in any of the embodiments described herein.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light of similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the mounting board 164 and the bottom of the mounting board 164. In one example, the bottom of mounting board 164 may be thermally coupled to a heat sink 130 (shown in FIGS. 1 and 2) via mounting base 101. In other examples, mounting board 164 may be directly coupled to a heat sink, or a lighting fixture and/or other mechanisms to dissipate the heat, such as a fan. In some embodiments, the mounting board 164 conducts heat to a heat sink thermally coupled to the top of the mounting board 164. For example, mounting board retaining ring 103 and cavity body 105 may conduct heat away from the top surface of mounting board 164. Mounting board 164 may be an FR4 board, e.g., that is 0.5 mm thick, with relatively thick copper layers, e.g., 30 µm to 100 µm, on the top and bottom surfaces that serve as thermal contact areas. In other examples, the mounting board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the mounting board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

The color conversion of light by wavelength converting materials embedded within or coated on output window 174 generates a significant amount of heat that must be dissipated from output window 174 to keep the temperature of the wavelength converting materials within an acceptable range. As such, the thermal interface between output window 174 and heat dissipating elements of LED based illumination device 100 is critically important. In addition, a significant amount of light emitted from LEDs 162 enters output window 174 and is incident to the perimeter surface of output window 174. Without an adequate reflective coating, much of this light escapes output window 174 along the perimeter surface and is rendered ineffective for illumination purposes. These losses are exacerbated as the thickness of output window 174 increases. For example, light leakage through the perimeter of an untreated output window 174 having a thickness of one or more millimeters is undesirable.

As illustrated in FIG. 4, LED based light emitting engine 170 includes a highly reflective coating 173 applied to the perimeter of output window 174. Highly reflective coating 173 is applied to the perimeter surface of output window 174 to redirect incident light back into output window 174. In some embodiments, highly reflective coating 173 has a reflectivity of greater than 90%. In some embodiments, highly reflective coating 173 is a metallic coating (e.g., aluminum) applied to the perimeter surface of output window 174 by a plating process (e.g., sputtering).

In addition to highly reflective coating 173, a highly thermally conductive material 172 is applied along the perimeter of output window 174 to thermally couple output window 174 to thermal frame 171. As illustrated in FIG. 4, highly reflective coating 173 and highly thermally conductive material 172 are different materials. In this manner, highly reflective coating 173 is chosen primarily for its optical reflectivity properties. The thermal resistivity of reflective coating 173 is minimized by selecting a highly reflective material that is thermally conductive (e.g., a metallic substance), minimizing the material thickness, or preferably, both.

However, in some other embodiments, a single material that is both highly reflective and highly thermally conductive is employed, rather than two different materials.

Figure 5:
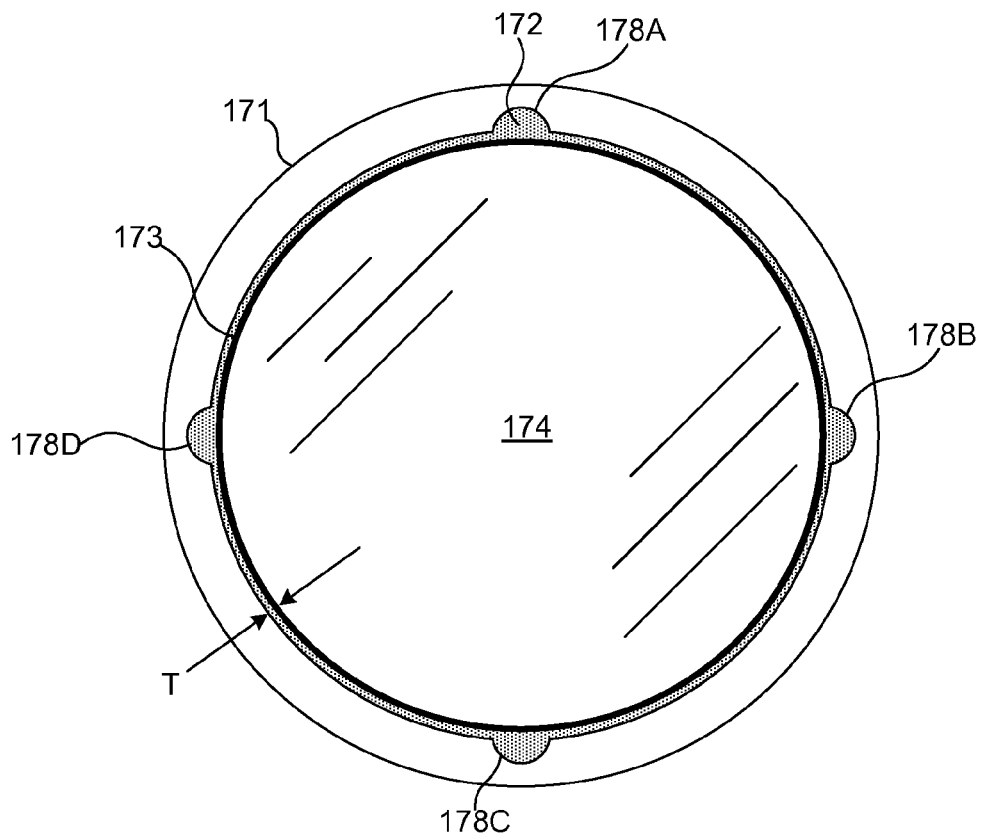
FIG. 5 illustrates a top view of the LED based light emitting engine depicted in FIG. 4.

Typically, materials with high reflectivity do not have the highest thermal conductivity. In one aspect, however, the overall thermal resistance between the output window 174 and the thermal frame 171 is minimized by dispensing a very thin layer of material between output window 174 and thermal frame 171. FIG. 5 illustrates a top view of LED based light emitting engine 170 depicted in FIG. 4. FIG. 5 illustrates the combined thickness of thermally conductive material 172 and reflective coating 173 as thickness T, which may be less than 500 micrometers, and preferably less than 250 micrometers. For thicknesses of less than 500 micrometers, thermally conductive material 172 and reflective coating 173 may be the same material to simplify the manufacturing process without an unacceptable loss in thermal conductivity.

In another aspect, thermal frame 171 may include one or more pockets, illustrated as pockets 178A-D. In the depicted embodiment, pockets 178A-D form small wells where a flowable thermally conductive material 172 is deposited. Thermally conductive material 172 then flows between output window 174 and thermal frame 171 with the aid of surface tension forces that arise due to the small gap (e.g., less than 250 micrometers) between output window 174 and thermal frame 171 and the wettability of the two elements. In this manner, pockets 178A-D simplify the deposition process associated with thermally conductive material 172 when the gap between output window 174 and thermal frame 171 is small (e.g., less than 250 micrometers). As discussed hereinbefore, the small gap between output window 174 and thermal frame 171 is critical, particularly when a single material is deposited between output window 174 and thermal frame 171 that is both highly reflective and thermally conductive. After filling the gap between output window 174 and thermal frame 171, the flowable, thermally conductive material is cured to form a permanent seal between output window 174 and thermal frame 171 that is both thermally conductive and highly reflective.

Figure 6:
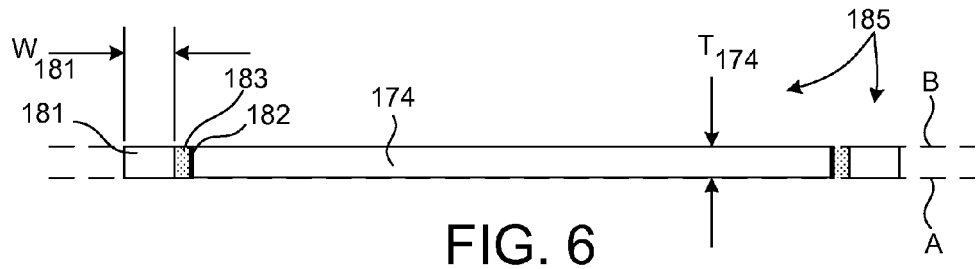
FIG. 6 illustrates a cross sectional view of an embodiment of an integrated output window sub-assembly.

FIG. 6 is a diagram illustrative of an integrated output window sub-assembly 185 in at least one novel aspect. Integrated output window sub-assembly 185 includes output window 174 and a thermally conductive ring 181 surrounding the perimeter of output window 174. If desired, the perimeter surface 182 of the output window 174 may have a highly reflective coating. In addition, a thermally conductive bonding material 183 may be disposed between output window 174 and thermally conductive ring 181. As noted in FIG. 6, the output window 174 has a thickness $T_{174}$ between a top surface and a bottom surface, and the thermally conductive ring 181 has a radial width $W_{181}$. The radial width $W_{181}$ of the thermally conductive ring 181 is equal to or greater than the thickness $T_{174}$ of the output window 174, which is advantageous to extract heat from the output window as well as providing surface area to couple to thermal frame 184, shown in FIG. 7.

In another implementation, the thermally conductive material 183 disposed between the output window 174 and the thermally conductive ring 181 may be optically transparent and the thermally conductive ring 181 may be reflective. In this embodiment, light from the output window 174 that is transmitted through the thermally conductive material will be incident on and reflected by the inner wall of the thermally conductive ring 181 and will return to the output window 174. By way of example, the thermally conductive ring 181 may be made of high-purity alumina whose reflectivity can be greater than 93% in the visible spectral band and the thermally conductive bonding material may be index matched to the output window 174. In this embodiment, there is no need for the highly reflective coating on the perimeter surface 182 of the output window 174.

Figure 8:
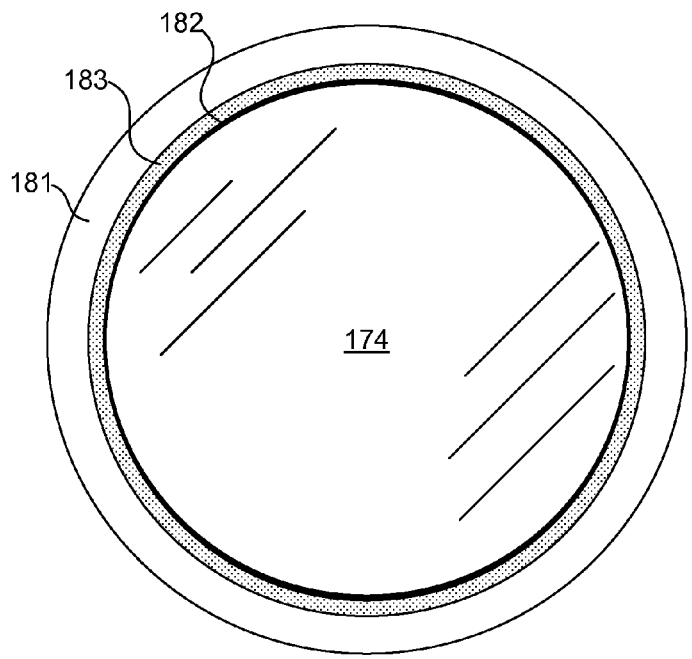
FIG. 8 illustrates a top view of the integrated output window sub-assembly depicted in FIG. 6.

FIG. 8 illustrates a top view of integrated output window sub-assembly 185. As discussed hereinbefore output window 174 may be constructed from a suitably transmissive material with adequate heat conduction properties. For example, output window 174 may be constructed from sapphire, quartz, alumina, crown glass, polycarbonate, etc. Thermally conductive ring 181 may be constructed from a thermally conductive material such as aluminum, copper, steel, stainless steel, etc. Thermally conductive bonding material 183 may be an adhesive or solder material.

In one aspect, the top surface of output window 174 and the top surface of thermally conductive ring 181 are coplanar and the bottom surface of output window 174 and the bottom surface of thermally conductive ring 181 are also coplanar. As depicted in FIG. 6, the top surface of output window 174 and the top surface of thermally conductive ring 181 are aligned with plane B and the bottom surface of output window 174 and the bottom surface of thermally conductive ring 181 are aligned with plane A. In this manner, either side of integrated output window sub-assembly 185 may be uniformly and accurately coated with a wavelength converting material, for example, by screen printing, blade coating, jetting, spraying, etc.

Figure 7:
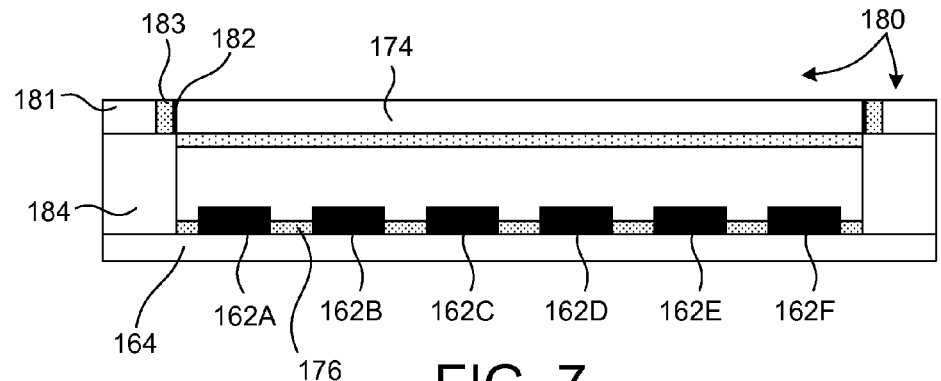
FIG. 7 is a diagram illustrating a cutaway view illustrating an LED based light emitting engine that includes integrated output window sub-assembly shown in FIG. 6.

FIG. 7 is a diagram illustrating a cutaway view of LED based light emitting engine 180 including integrated output window sub-assembly 185. As depicted in FIG. 7, a thermal frame 184 is coupled between thermally conductive ring 181 and LED mounting board 164 to transmit heat from output window 174 to LED mounting board 164. In some embodiments, thermal frame 184 is soldered between thermally conductive ring 181 and LED mounting board 164. The solder used to bond thermal frame 184 to thermally conductive ring 181 and LED mounting board 164 has a lower melting temperature than any solder used to assemble integrated output window sub-assembly 185. In this manner, integrated output window sub-assembly 185 can be soldered onto LED based light emitting engine 180 without compromising the integrity of the sub-assembly.

Figure 9:
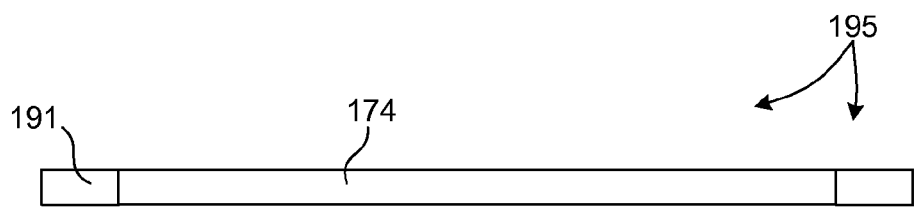
FIG. 9 illustrates a cross sectional view of another embodiment of an integrated output window sub-assembly.

FIG. 9 is a diagram illustrative of an integrated output window sub-assembly 195 in at least one novel aspect. Integrated output window sub-assembly 195 includes output window 174 and a thermally conductive ring 191 surrounding the perimeter of output window 174. As depicted in FIG. 9, the thermally conductive ring 191 is a thermally conductive and highly reflective ceramic material (e.g., aluminum oxide, aluminum nitride, silicon carbide, silicon nitride, etc.).

Figure 11:
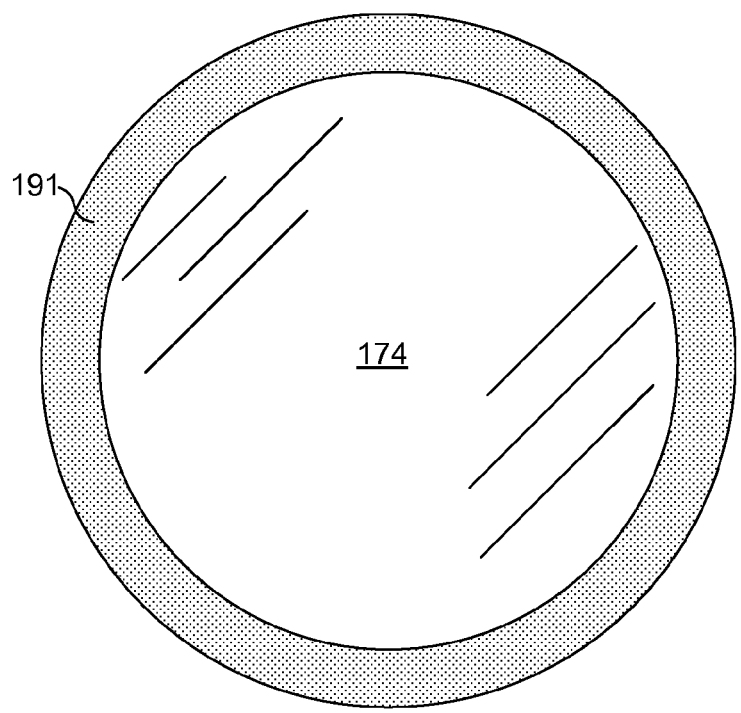
FIG. 11 illustrates a top view of the integrated output window sub-assembly depicted in FIG. 9.

FIG. 11 illustrates a top view of integrated output window sub-assembly 195. As discussed hereinbefore output window 174 may be constructed from a suitably transmissive material with adequate heat conduction properties. For example, output window 174 may be constructed from sapphire, quartz, alumina, crown glass, polycarbonate, etc. Thermally conductive ring 191 may be constructed from a thermally conductive ceramic such as aluminum oxide, aluminum nitride, silicon carbide, silicon nitride, etc. In some embodiments, thermally conductive ring 191 is bonded to output window 174 with an adhesive or a solder material. In some other embodiments, thermally conductive ring 191 is disposed around output window 174 and co-fired together with output window 174 to create a bond between the two materials.

The top surface of output window 174 and the top surface of thermally conductive ring 191 are coplanar and the bottom surface of output window 174 and the bottom surface of thermally conductive ring 191 are also coplanar. In this manner, either side of integrated output window sub-assembly 195 may be uniformly and accurately coated with a wavelength converting material, for example, by screen printing, blade coating, jetting, spraying, etc.

Figure 10:
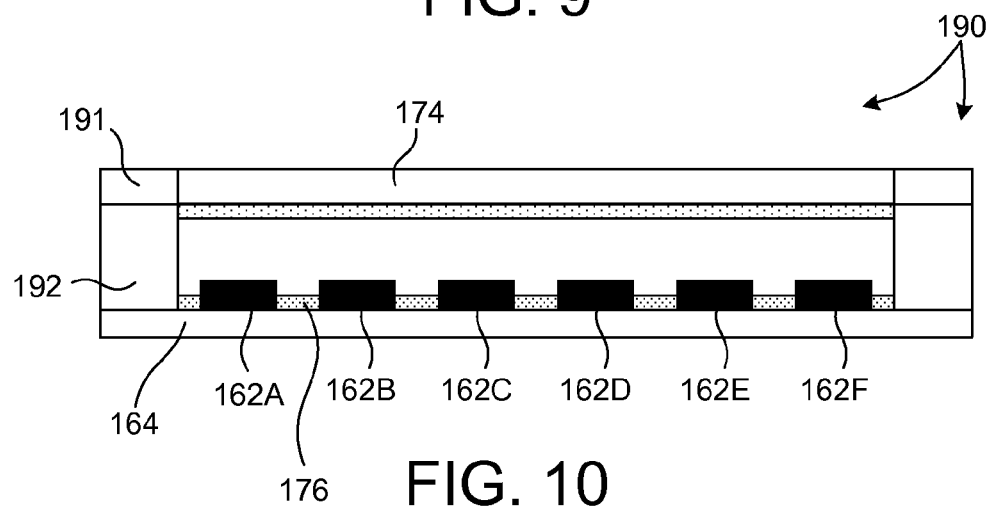
FIG. 10 is a diagram illustrating a cutaway view illustrating an LED based light emitting engine that includes integrated output window sub-assembly shown in FIG. 9.

FIG. 10 is a diagram illustrating a cutaway view of LED based light emitting engine 190 including integrated output window sub-assembly 195. As depicted in FIG. 10, a thermal frame 192 is coupled between thermally conductive ring 191 and LED mounting board 164 to transmit heat from output window 174 to LED mounting board 164. In some embodiments, thermal frame 192 is soldered between thermally conductive ring 191 and LED mounting board 164. The solder used to bond thermal frame 192 to thermally conductive ring 191 and LED mounting board 164 has a lower melting temperature than any solder used to assemble integrated output window sub-assembly 195. In this manner, integrated output window sub-assembly 195 can be soldered onto LED based light emitting engine 190 without compromising the integrity of the sub-assembly. To promote adhesion of the solder material to the ceramic elements, it may be necessary to plate surfaces of the ceramic elements to be soldered. Hence, plating of appropriate surfaces of ceramic elements to enhance bonding is contemplated herein.

In some embodiments, either thermally conductive ring 181 or thermally conductive ring 191 may include pockets as described with reference to FIG. 5 to promote the adhesion of the thermally conductive ring to the output window with a flowable, thermally conductive material (e.g., adhesive, solder, etc.).

In another aspect, an integrated output window sub-assembly such as integrated output window sub-assemblies 185 and 195 are sawn from a cylindrically shaped, composite cylinder, and subsequently polished on both sides.

Figure 13:
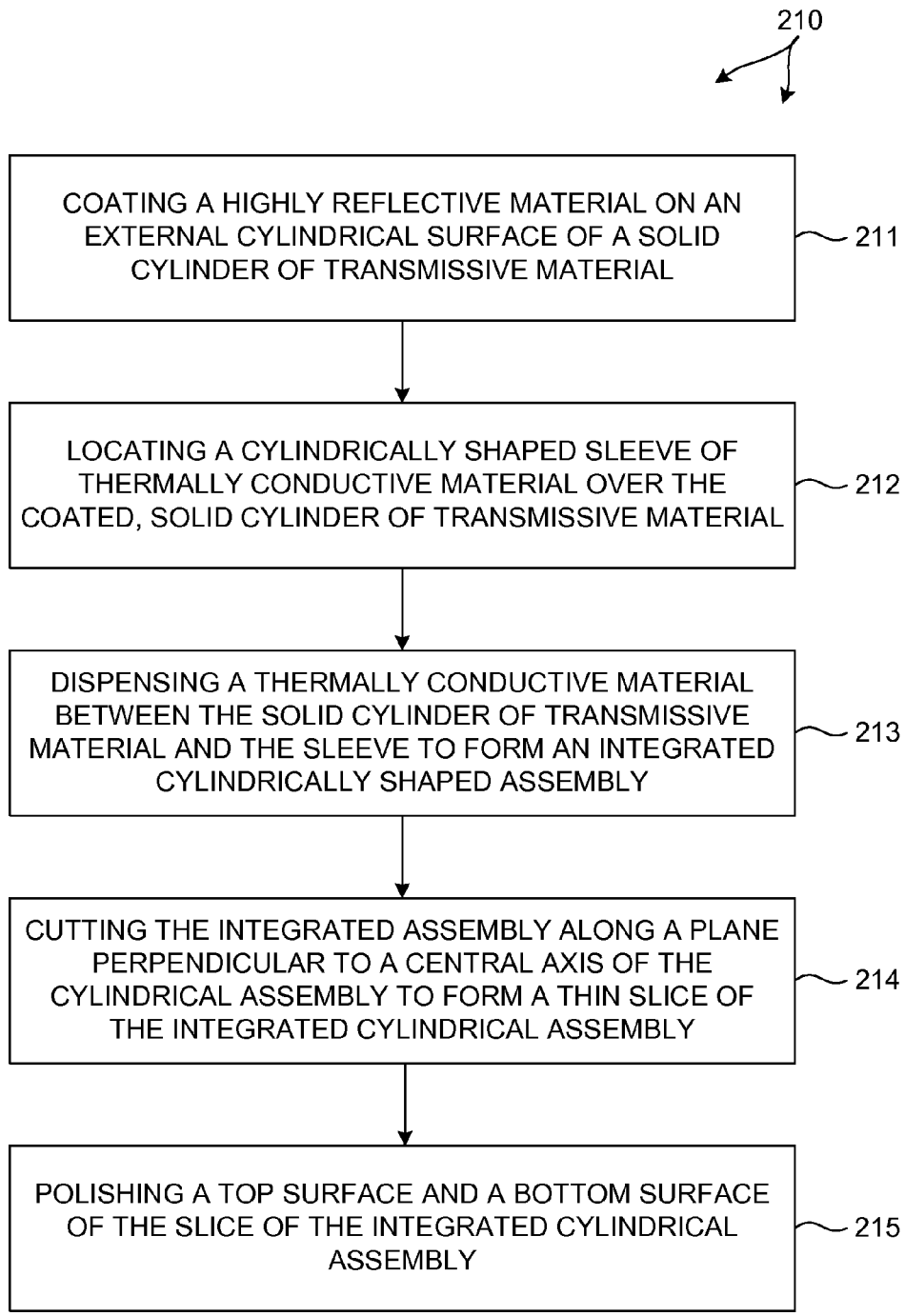
FIG. 13 illustrates a method of manufacturing an integrated output window assembly such as integrated output window assembly described with reference to FIG. 6.

FIG. 13 illustrates a method 210 of manufacturing an integrated output window assembly such as integrated output window assembly 180 described with reference to FIG. 6.

Figure 12:
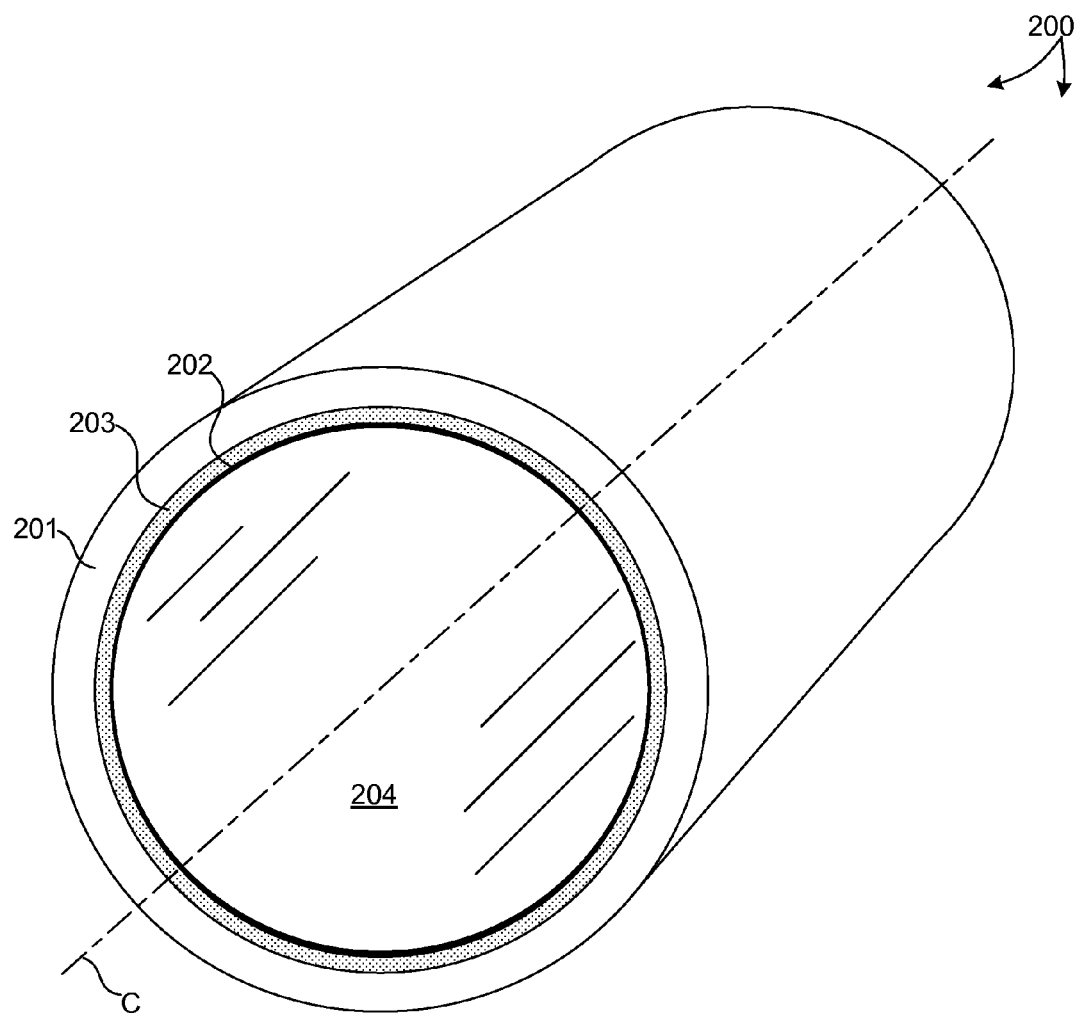
FIG. 12 illustrates a cylindrically shaped, composite cylinder from which a number of integrated output window sub-assemblies, such as those described with reference to FIG. 6, may be made.

In block 211, a highly reflective material is coated on an external cylindrical surface of a solid cylinder of transmissive material. By way of non-limiting example, FIG. 12 illustrates a cylindrically shaped, composite cylinder 200 from which a number of integrated output window sub-assemblies, such as those described with reference to FIG. 6, may be made. As depicted in FIG. 12 a cylindrically shaped amount of transmissive material 204 is coated with a highly reflective material 202. In one example, the cylindrically shaped amount of transmissive material 204 is a cylindrically shaped sapphire ingot. By way of non-limiting example, an ingot of sapphire may be ground to achieve a cylindrical shape having a desired size that is further processed in accordance with the methods described herein. In one embodiment, the highly reflective material 202 is not used, and thus, block 211 may be skipped.

In block 212, a cylindrically shaped sleeve of thermally conductive material is located over the solid cylinder of transmissive material, which may be coated. As depicted in FIG. 12, cylindrically shaped sleeve 201 is located concentric with the cylindrically shaped amount of transmissive material 204. By way of non-limiting example, the cylindrically shaped sleeve 201 may be constructed from an aluminum, copper, or steel based material. If the highly reflective material 202 is not used, the inside surface of the cylindrically shaped sleeve 201 is highly reflective In block 213, a thermally conductive material is dispensed between the solid cylinder of transmissive material and the sleeve to form an integrated cylindrically shaped assembly. The thermally conductive material may be optically transparent and index matched to the transmissive material 204. As depicted in FIG. 12, thermally conductive material 203 bonds the cylindrically shaped sleeve 201 of thermally conductive material with the cylindrically shaped amount of transmissive material.

In block 214, the integrated cylindrically shaped assembly is cut along a plane perpendicular to a central axis of the cylindrical assembly to form a thin slice of the integrated cylindrical assembly 200 includes a central axis, C. Assembly 200 may be cut by a sawing process such as diamond sawing, a laser cutting process, etc.

In block 215, the thin slice of the integrated cylindrical assembly 200 is polished across the top surface and the bottom surface of the slice to generate an integrated output window sub-assembly. The polishing may be achieved by a grinding process, a polishing process, etc.

Figure 14:
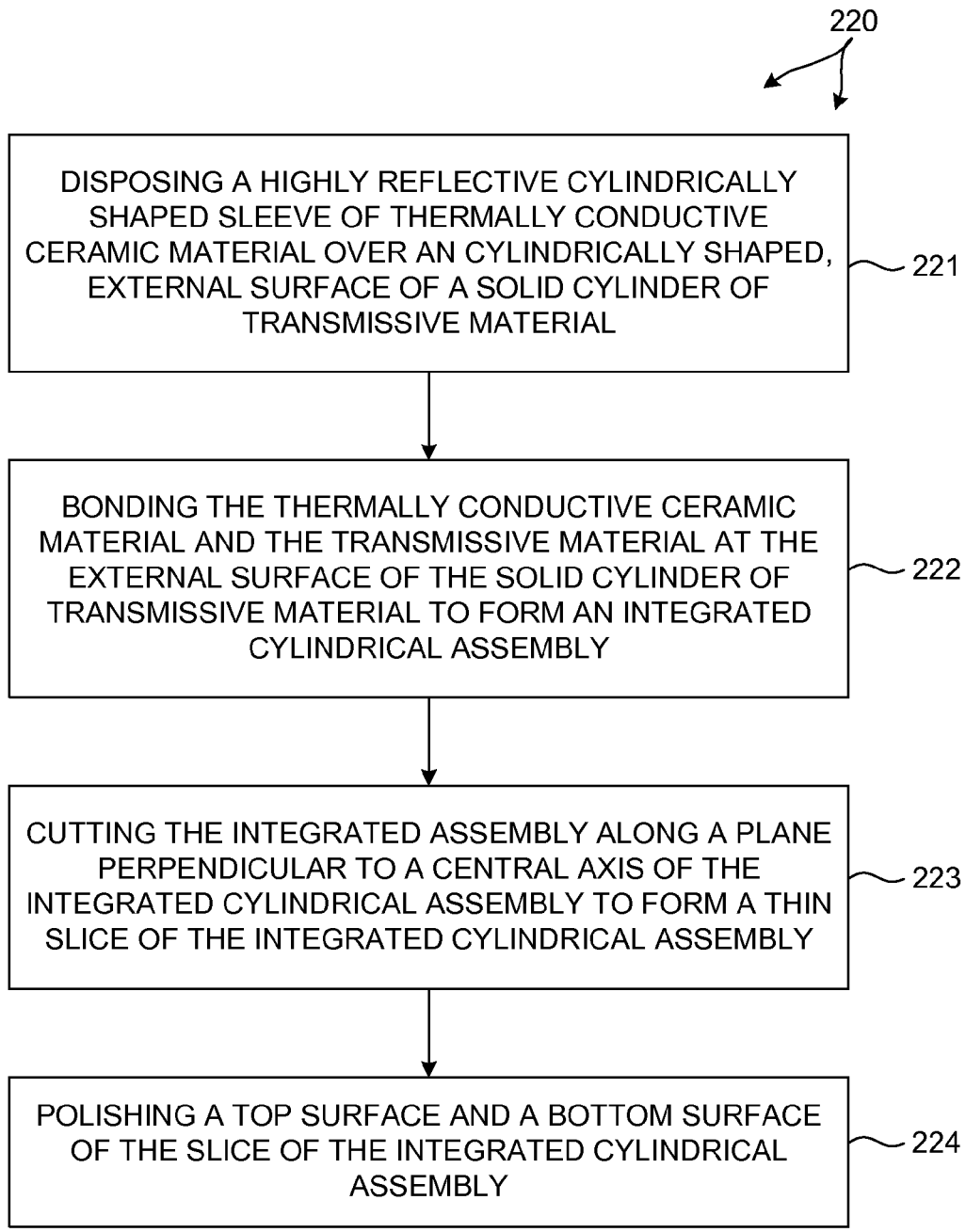
FIG. 14 illustrates a method of manufacturing an integrated output window assembly such as integrated output window assembly described with reference to FIG. 9.

FIG. 14 illustrates a method 220 of manufacturing an integrated output window assembly such as integrated output window assembly 190 described with reference to FIG. 9.

In block 221, a highly reflective cylindrically shaped sleeve of thermally conductive ceramic material is located over a cylindrically shaped, external surface of a solid cylinder of transmissive material. In one example, cylindrically shaped ceramic material is located concentric with a cylindrical ingot of transmissive material 204 (e.g., a sapphire ingot).

In block 222, the thermally conductive ceramic material and the transmissive material are bonded together at the external surface of the solid cylinder of transmissive material to form an integrated cylindrical assembly. In one example, the thermally conductive ceramic material and the transmissive material are bonded together by an adhesive. In another example, the thermally conductive ceramic material and the transmissive material are bonded together by co-firing the materials.

In block 223, the integrated assembly is cut along a plane perpendicular to a central axis of the integrated cylindrical assembly to form a thin slice of the integrated cylindrical assembly.

In block 224, a top surface and a bottom surface of the slice of the integrated cylindrical assembly are polished to form an integrated output window sub-assembly.

In yet another method of manufacturing an integrated output window assembly such as integrated output window assembly 180 described with reference to FIG. 6, a cylindrically shaped sleeve of thermally conductive material may be cast over a solid cylinder of transmissive material.

Figure 15:
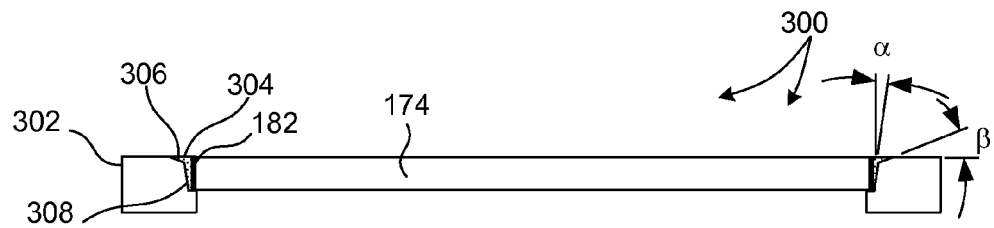
FIG. 15 illustrates a cross sectional view of an embodiment of an integrated output window sub-assembly.

FIG. 15 is a diagram illustrative of an integrated output window sub-assembly 300 in at least one novel aspect. Output window sub-assembly 300 includes output window 174 and a thermally conductive ring 302 surrounding the perimeter of output window 174. If desired, the perimeter surface 182 of the output window 174 may have a highly reflective coating. The radial width of the thermally conductive ring 302 may be equal to or greater than the thickness of the output window 174, which is advantageous to extract heat from the output window as well as providing surface area to couple to the thermal frame 310, shown in FIG. 16. A thermally conductive bonding material 304 may be disposed between output window 174 and thermally conductive ring 302. As illustrated in FIG. 15, the thermally conductive ring 302 includes an inside diameter with a shallow pocket 306 in the form of a radial taper at the top surface of the thermally conductive ring 302 and a tapered sidewall 308 forming a gap, in which the output window 174 is mounted. By way of example, the tapered sidewall 308 may have an angle α, which may be, e.g., 8°, and the radial taper 306 may have an angle β, which may be, e.g., 19°. Other angles may be used if desired. The gap between the periphery 182 of the output window 174 and the conductive ring 302 formed by the tapered sidewall 308 is filled with the thermally conductive bonding material 304 through capillary action, which is introduced at the radial pocket 306. The thermally conductive bonding material 304 may be, e.g., a silicon thermal adhesive with a high flow rate to permit the capillary action. Moreover, with the use of a white, or otherwise highly reflective, thermally conductive bonding material 304, the use of a reflective coating on the periphery 182 of the output window 174 may be obviated.

Figure 17:
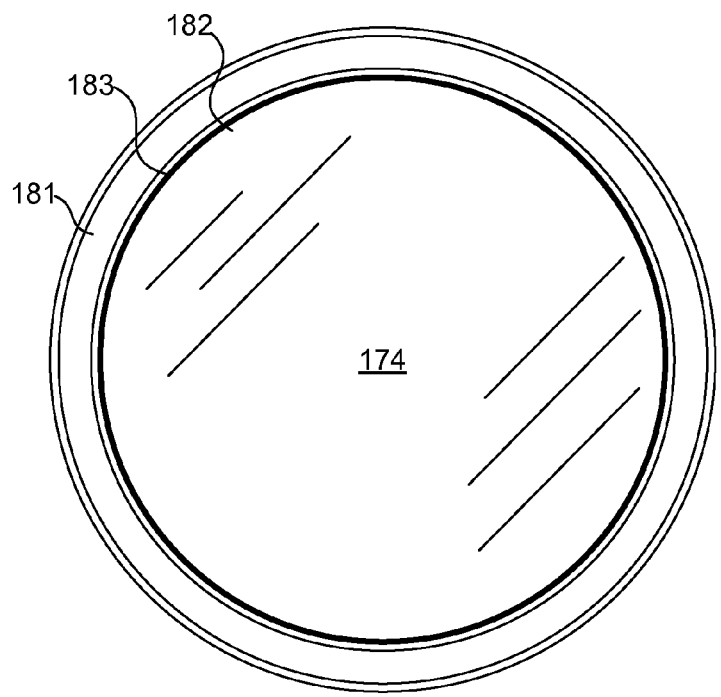
FIG. 17 illustrates a top view of the integrated output window sub-assembly depicted in FIG. 15.

FIG. 17 illustrates a top view of integrated output window sub-assembly 300. As discussed hereinbefore output window 174 may be constructed from a suitably transmissive material with adequate heat conduction properties. For example, output window 174 may be constructed from sapphire, quartz, alumina, crown glass, polycarbonate, etc. Thermally conductive ring 302 may be constructed from a thermally conductive material such as aluminum, copper, steel, stainless steel, etc.

Figure 16:
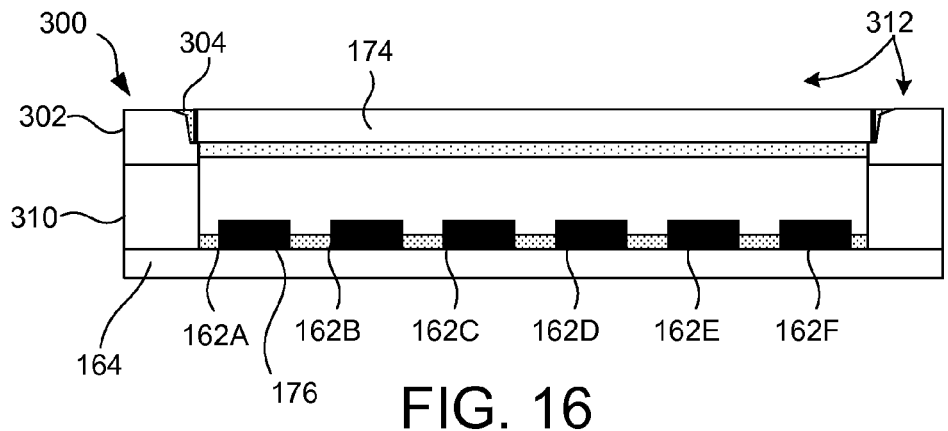
FIG. 16 is a diagram illustrating a cutaway view illustrating an LED based light emitting engine that includes integrated output window sub-assembly shown in FIG. 15.

FIG. 16 is a diagram illustrating a cutaway view of LED based light emitting engine 312 including integrated output window sub-assembly 300. As depicted in FIG. 16, a thermal frame 310 is coupled between thermally conductive ring 300 and LED mounting board 164 to transmit heat from output window 174 to LED mounting board 164. In some embodiments, thermal frame 310 is soldered between thermally conductive ring 302 and LED mounting board 164. The solder used to bond thermal frame 310 to thermally conductive ring 302 and LED mounting board 164 has a lower melting temperature than any solder used to assemble integrated output window sub-assembly 300, if any. In this manner, integrated output window sub-assembly 300 can be soldered onto LED based light emitting engine 312 without compromising the integrity of the sub-assembly.

Although certain specific embodiments are described above for instructional purposes, the teachings of this patent document have general applicability and are not limited to the specific embodiments described above. For example, although embodiments of an integrated output window assembly having a circular shape are generated by slicing a cylindrically shaped composite assembly, other shapes may be contemplated. By way of non-limiting example, a solid bar shaped composite assembly may be constructed, and a rectangular shaped, integrated output window assembly may be generated by slicing the bar shaped composite assembly. In general, many other shapes may be contemplated (e.g., square and general polygonal shapes). Accordingly, various modifications, adaptations, and combinations of various features of the described embodiments can be practiced without departing from the scope of the invention as set forth in the claims.

What is claimed is:

1. An LED based illumination device, comprising:
    a plurality of LEDs mounted to an LED mounting board;
    an integrated output window sub-assembly comprising:
        an output window having a top surface, a bottom surface, and a perimeter surface, wherein the output window has a thickness between the top surface and the bottom surface,
        a thermally conductive ring coupled to the perimeter surface of the output window, wherein the thermally conductive ring comprises a radial taper disposed along an inner surface facing the perimeter surface of the output window that forms a gap between the thermally conductive ring and the output window that is filled with a thermally conductive bonding material; and
    wherein the thermally conductive ring of the integrated output window sub-assembly is coupled to the LED mounting board.

2. The LED based illumination device of claim 1, wherein the thermally conductive ring is a ceramic material.

3. The LED based illumination device of claim 2, wherein the ceramic material is any of an aluminum oxide, an aluminum nitride, a silicon carbide, and a silicon nitride.

4. The LED based illumination device of claim 1, wherein the thermally conductive ring is a metallic material, and wherein the thermally conductive ring is coupled to the perimeter surface of the output window by a solder.

5. The LED based illumination device of claim 1, further comprising:
    a highly reflective material deposited on the perimeter surface of the output window.

6. The LED based illumination device of claim 5, wherein the highly reflective material is a metallic material.

7. The LED based illumination device of claim 1, wherein the gap between the thermally conductive ring and the output window is less than 500 microns.

8. The LED based illumination device of claim 1, wherein the thermally conductive ring of the integrated output window sub-assembly is coupled to the LED mounting board with an adhesive or a solder.

9. The LED based illumination device of claim 8, wherein the solder has a lower melting temperature than a melting temperature of the thermally conductive bonding material in the gap between the thermally conductive ring and the output window employed to couple the thermally conductive ring to the perimeter surface of the output window.

10. An LED based illumination device comprising:
    an output window comprising a wavelength converting material;
    a thermally conductive ring having an inside diameter surrounding a perimeter of the output window; and
    a curable, thermally conductive bonding material disposed between the output window and the thermally conductive ring, wherein the thermally conductive ring includes at least one pocket in the inside diameter, wherein the curable, thermally conductive bonding material is disposed into the at least one pocket in an uncured state and flows into a gap between the perimeter of the output window and the thermally conductive ring.

11. The LED based illumination device of claim 10, wherein the gap between the perimeter of the output window and the thermally conductive ring is less than 500 microns.

12. The LED based illumination device of claim 10, further comprising:
    an LED mounting board populated with a plurality of LEDs, wherein the thermally conductive ring is coupled to the LED mounting board.

13. The LED based illumination device of claim 10, wherein the curable, thermally conductive bonding material is a silicone based adhesive.

14. The LED based illumination device of claim 10, wherein the at least one pocket is selected from one of a plurality of pockets and a radial taper of a top surface of the thermally conductive ring.

\* \* \* \* \*